United States Patent [19]

Gödecker

[11] Patent Number: 5,544,171
[45] Date of Patent: Aug. 6, 1996

[54] CELLULAR RADIO BASE STATION AND CONTROL FOR EXTENDING RANGE TO MOBILE STATIONS OUTSIDE RADIO CELL

[75] Inventor: Reinhold Gödecker, Renningen, Germany

[73] Assignee: Alcatel N.V., Rijswijk, Netherlands

[21] Appl. No.: 365,519

[22] Filed: Dec. 28, 1994

[30] Foreign Application Priority Data

Jan. 7, 1994 [DE] Germany .......................... 44 00 331.5

[51] Int. Cl.$^6$ .............................. H04B 7/212; H04B 7/26
[52] U.S. Cl. ......................... 370/95.3; 379/59; 455/333.1; 455/54.1
[58] Field of Search ................................ 370/95.1, 95.3, 370/100.1, 104.1, 105.3, 108; 375/356, 362, 371, 346, 347; 379/58, 59, 60, 63; 455/33.1, 33.2, 34.1, 34.2, 53.1, 54.1, 54.2, 56.1, 51.1, 52.1, 52.3, 63, 65, 67.1, 67.6

[56] References Cited

U.S. PATENT DOCUMENTS

| 5,077,759 | 12/1991 | Nakahara | 375/356 |
|---|---|---|---|
| 5,363,376 | 11/1994 | Chuang et al. | 370/95.3 |
| 5,446,739 | 8/1995 | Nakano et al. | 370/95.3 |
| 5,459,728 | 10/1995 | Yoshioka et al. | 370/95.3 |

FOREIGN PATENT DOCUMENTS

| 5753294 | 9/1994 | Australia . |
|---|---|---|
| 0295227 | 12/1988 | European Pat. Off. . |
| 0511614 | 11/1992 | European Pat. Off. . |
| 0511861 | 11/1992 | European Pat. Off. . |
| 0564429 | 10/1993 | European Pat. Off. . |
| 0614290 | 9/1994 | European Pat. Off. . |
| 9302472 | 3/1993 | France . |
| 4140742 | 6/1973 | Germany . |
| 3011935 | 10/1981 | Germany . |
| 3441722 | 5/1986 | Germany . |
| 9502307 | 1/1995 | WIPO . |

OTHER PUBLICATIONS

M. Mouly et al, "the GSM–System for Mobile Communications", pub. by authors in 1992, Palaiseau, France, Chap. 6.1.5.2, Timing Advance, pp. 346–349.
"Digital Mobile Radio Telephone System Using TD/FDMA Scheme", K. Kinoshita et al, *IEEE International Communication Conference*, vol. 1–4, Jun. 14–18, 1981, Denver, pp. 23.4.1–23.4.5.

*Primary Examiner*—Alpus H. Hsu
*Attorney, Agent, or Firm*—Ware, Fressola, Van Der Sluys & Adolphson

[57] ABSTRACT

In cellular radio networks with TDMA transmission, the maximum signal propagation time inside a radio cell limits its propagation to a maximum radius, e.g. to 35 km in the known GSM. To extend the radio cell, the invention provides a fixed base station (BTS) with a TDMA radio receiver (RX) and an additional TDMA radio receiver (RXe), which receives lagging TDMA radio pulses from mobile stations (MS3) that are positioned outside of the radio cells (C). In this way, the fixed base station (BTS) supplies an extended radio cell (Ce), in which however only the maximum signal propagation time corresponding to the maximum expansion of the (small) radio cell (C) requires compensation.

4 Claims, 2 Drawing Sheets

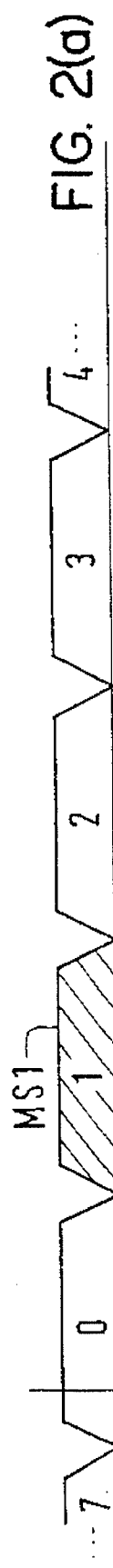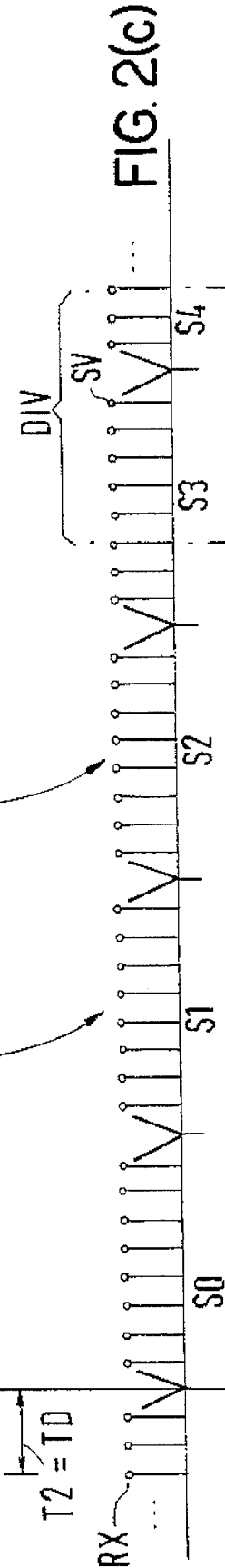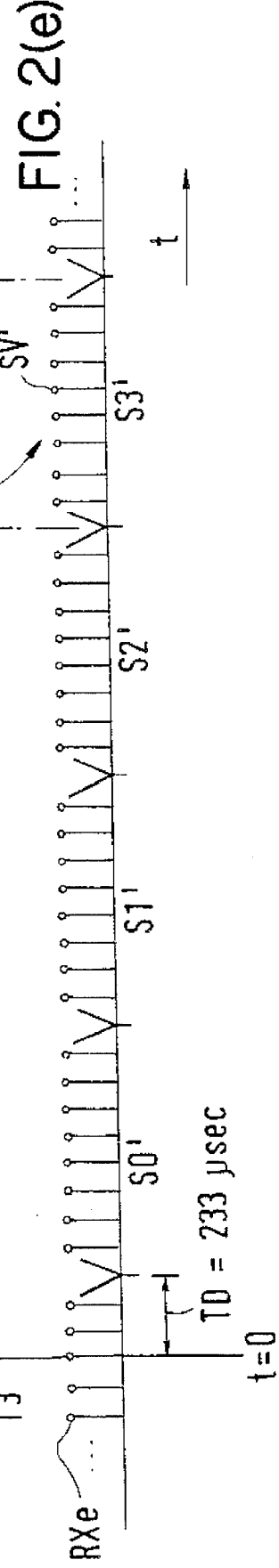

CELLULAR RADIO BASE STATION AND CONTROL FOR EXTENDING RANGE TO MOBILE STATIONS OUTSIDE RADIO CELL

TECHNICAL FIELD

The invention concerns a fixed base station for a cellular radio network.

BACKGROUND OF THE INVENTION

Such a fixed base station is described in the book "The GSM-System for Mobile Communications" by M. Mouly and M.-B. Pautet, which was published in 1992 by the publishing firm at 49, rue Louise Brunea, F-91120 Palaiseau, France. It describes a fixed base station for the GSM cellular radio network (Global System for Mobile Communications), which exchanges radio pulses with mobile stations within a radio cell in accordance with the TDMA (Time Division Multiple Access) radio transmission process. Chapter 6.1.5.2 "Timing Advance" describes how the propagation times of the TDMA radio pulses are balanced inside the cell, whereby a so-called "Timing Advance" is taken into consideration when these radio pulses are transmitted by the mobile station. This is the time interval at which the TDMA radio pulses are transmitted by the mobile station in advance of the time slot sequence within the fixed base station. The timing advance can be changed between 0 µs and 233 µs, which serves to compensate for signal propagation times of the same size within the radio cell. The expansion of the radio cell is limited to a maximum radius of 35 km, which corresponds to the maximum signal propagation time of 233 µs. In the described GSM radio network, the limitation of the radio cell is based on a limitation of the time advance coding. Radio pulses from mobile stations outside of this radio cell cannot be received. To achieve a desired enlargement of the radio cell, the book proposes to charge only every other time slot within the time slot sequence, which is the same as enlarging the protection times between radio pulses. However, this measure requires a change in the fixed base station's receiving method, as indicated by the authors themselves on page 347. Furthermore, this measure leads to the fact that only half of the channel capacity can be used for a radio transmission. Measures to circumvent these problems are not addressed in the book.

The Australian patent application PM 2427 of Nov. 15, 1993 proposes to equip the TDMA fixed base station with two receivers receiving on one frequency, but time-displaced with respect to each other by the maximum signal propagation time. This causes one of the receivers to receive the TDMA radio pulses from mobile stations inside the radio cell, and the other receives TDMA radio pulses from mobile stations outside of the radio cell. In this way the supply area of the TDMA fixed base station becomes an extended radio cell with double the cell radius. However, the TDMA radio pulses that are transmitted by the mobile stations can collide with each other at the receiving place, i.e. the location of the fixed base station. This creates interference between the TDMA radio channels.

DISCLOSURE OF INVENTION

It is an object of the invention to make a fixed base station available, and means for a TDMA radio transmission within a radio cell, which makes it possible to extend the radio cell simply by circumventing the above cited problems.

According to the present invention, a radio cell can be expanded by realizing that any radio signals received from outside the normal radius of the cell will be delayed at least by the maximum transmission time from the edge of the cell to the base station, and further by equipping the base station with a second radio receiver that is responsive to radio transmissions from outside the normal radius of the cell at least delayed by said maximum transmission time and, further, by having a controller within the base station that groups radio signals from mobile stations within the normal cell into adjacent timeslots within a sequence of such timeslots, and which separately groups radio signals from outside the normal cell into adjacent timeslots within the sequence, the groups thereby being non-overlapping and thereby maximizing efficiency of the time-division multiple access system.

Thus, according to a first aspect of the present invention, a fixed base station for a cellular radio network comprises a TDMA radio receiver for a radio cell that receives TDMA radio pulses (bursts) on at least one carrier frequency within a sequence of time slots which are transmitted by at least one mobile station with reference to a time that is advanced by one time interval with respect to one of the time slots, which interval increases with distance from the fixed base station to a maximum time interval corresponding the maximum signal propagation time within the radio cell, to compensate for the propagation time of the TDMA radio pulse, wherein the fixed base station contains at least one additional TDMA radio receiver, which receives on the at least one carrier frequency, but within a sequence of time slots that lags at least by the maximum time interval, and that the fixed base station, by means of a TDMA time control and by means of a radio transmitter, assigns such time slots, which are adjacent to each other, to mobile stations inside the radio cell and assigns such other time slots which are adjacent to each other to the mobile stations outside of the radio cell for transmitting the TDMA radio pulses, so that the fixed base station (BTS) receives the TDMA radio pulses from the most possible mobile stations within an extended radio cell.

According to a second aspect of the present invention, a time-division multiple access (TDMA) time control for controlling a fixed base station for a cellular radio network, which contains a TDMA radio receiver for a radio cell, which receives TDMA radio pulses (bursts) on at least one carrier frequency within a sequence of time slots that are transmitted by at least one mobile station with reference to a time that is advanced by one time interval with respect to one of the time slots, which increases with the distance from the fixed base station to a maximum time interval corresponding to the maximum signal propagation time within the radio cell, to compensate for the signal propagation time of the TDMA radio pulse, is characterized in that the TDMA time control for controlling the fixed base station, which contains at least one additional TDMA radio receiver receiving on at least the one carrier frequency, but within a sequence of time slots that lags at least by the maximum time interval, by means of a radio transmitter assigns such time slots, which are adjacent to each other, to mobile stations inside and assigns such other time slots, which are also adjacent each other, to mobile stations outside of the radio cell for transmitting the TDMA radio pulses, so that the fixed base station receives the TDMA radio pulses from the most possible mobile stations within an extended radio cell.

Accordingly, a fixed base station is proposed for a cellular radio network, which contains another TDMA radio receiver in addition to the usual one, and receives on the same carrier frequency as the first one, but lagging by at least the time interval that corresponds to the maximum signal propagation time. The assignment of time slots is controlled by a TDMA time control that is connected to the fixed base station, by assigning adjacent time slots to the mobile stations inside and outside of the radio cell for emission of the TDMA radio pulses, which allows the fixed base station to receive the TDMA radio pulses of the most possible mobile stations within an extended radio cell.

These and other objects, features and advantages of the present invention will become more apparent in light of the detailed description of a best mode embodiment thereof, as illustrated in the accompanying drawing.

BRIEF DESCRIPTION OF THE DRAWING

FIG. 2(a)–2(e) represent timing diagram for the emission and reception of TDMA radio pulses, according to the invention.

BEST MODE FOR CARRYING OUT THE INVENTION

Figure 1A:
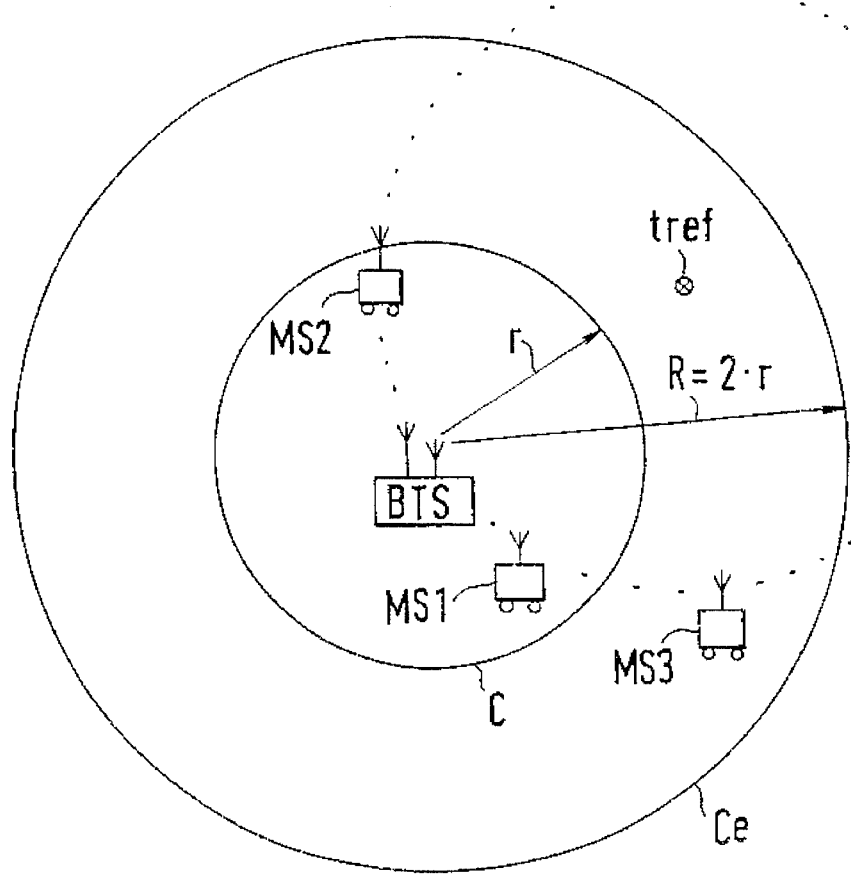
FIG. 1A is a fixed base station according to the invention with an extended radio cell.

FIG. 1A schematically illustrates, according to the present invention, an extended radio cell Ce, which is centrally supplied by a fixed base station BTS. The extended radio cell Ce has a radius R and concentrically encloses a radio cell C with a radius r. Mobile stations MS1 and MS2 are positioned inside this radio cell C, and a different time slot is assigned to each for transmitting TDMA radio pulses. As a function of their respective distance from the fixed base station BTS, the mobile stations transmit in advance of a time interval (timing advance), so that, when received by the fixed base station, the TDMA radio pulses are arranged without overlapping in the sequence of the time slots, and compensate for the signal propagation time within the radio cell C. The mobile stations MS1 and MS2 are in a position to transmit the TDMA radio pulses in advance by a maximum of 233 μs. This time interval corresponds to the maximum signal propagation time needed by a radio signal when it is transmitted from the edge of the radio cell C to the location of the fixed base station. The radius r of the radio cell is therefore about 35 km.

A mobile station MS3 is positioned outside of the radio cell C, which also transmits TDMA radio pulses in advance by a time interval between 0 μs and 233 μs. The TDMA radio pulses transmitted by this mobile station cannot be received by a conventional fixed base station. The fixed base station BTS, which is described in more detail below, is able to receive these TDMA radio pulses inside of a receiving radius R, which is larger than radius r of radio cell C. This creates the extended radio cell Ce, whose radius R is double that of r in this example.

A configuration of the fixed base station BTS according to the invention will now be described by means of FIGS. 1B and FIGS. 2(a)–2(e).

Figure 1B:
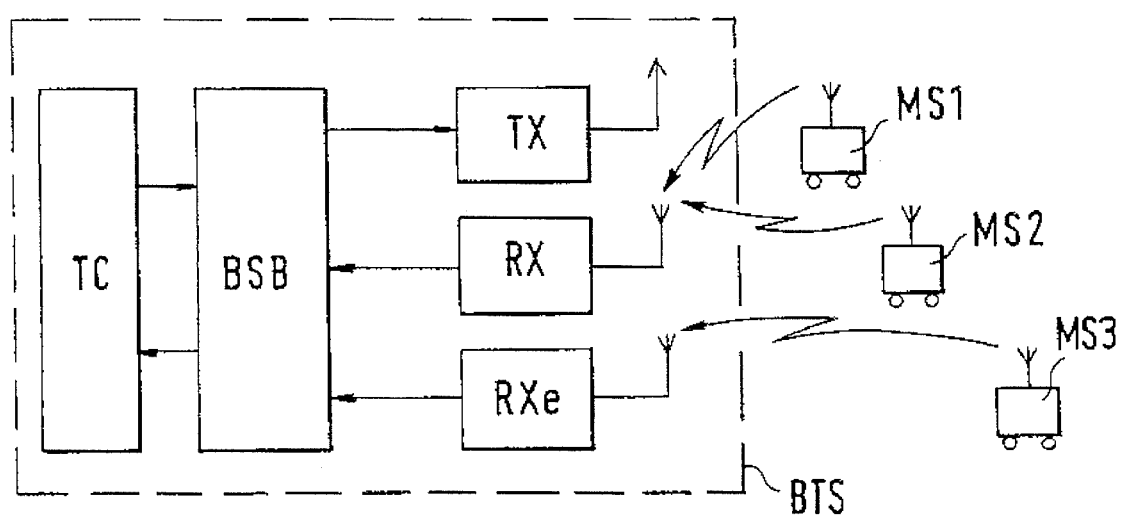
Fig. 1B is a block circuit diagram of the fixed base station of FIG. 1A.

FIG. 1B schematically illustrates the construction of fixed base station BTS. It contains a radio transmitter TX with a connected transmitting antenna, a TDMA radio receiver RX with a receiving antenna and an additional TDMA radio receiver RXe with another receiving antenna. The radio transmitter TX and the two TDMA radio receivers are connected to a digital circuit BSB that processes the radio signals to be transmitted or which have been received. The fixed base station BTS further contains a time control TC that is connected to the digital circuit, which controls the time slot assignment for the TDMA radio transmission as well as synchronization.

In this example, the fixed base station and the mobile stations are designed for TDMA radio transmission according to the GSM standard. Through its radio transmitter TX, the fixed base station accordingly informs the mobile stations of the assignment of those time slots, in which the mobile stations transmit their TDMA radio pulses. The radio signals transmitted by the mobile stations are received by both TDMA radio receivers RX and RXe, where the reception at the additional TDMA radio receiver RXe lags one time interval behind the reception at the TDMA radio receiver RX. This time interval corresponds to the maximum signal propagation time for which mobile radio stations can provide compensation. The time-displaced reception by both TDMA radio receivers is achieved by the time-displaced scanning of the radio signals. In the following, the transmission and reception of the TDMA radio pulses is described in greater detail with the aid of FIGS. 2(a)–2(e).

Above a common time axis t, FIGS. 2(a)–2(e) depict the time intervals in which the TDMA radio pulses are transmitted from the mobile stations on the transmission side, and received and scanned by the TDMA radio receivers on the receiving side. The chosen reference point in time t =0 is when the radio receiver RX begins to receive a sequence of time slots S0, S1, ..., S7, as shown in FIG. 2(c). The mobile stations inside radio cell C send their TDMA radio pulses in such a way, that they integrate themselves into this sequence of time slots when received by radio receiver RX, as shown by transition arrows from MS1 and MS2 in FIGS. 2(a) and 2(b), respectively, to timeslots S1 and S2 in FIG. 2(c).

The time displacements described below refer to signal propagation times of the TDMA radio pulses, i.e. to the signal propagation times of electromagnetic waves. The time reference $t_{ref}=0$ must therefore be interpreted as if it had been defined by a light signal transmitter located at the same distance from the fixed base station and the mobile stations. The location of this imaginary optical transmitter is shown in FIG. 1A. The distances between each of the mobile stations and the fixed base station indicated in FIG. 1A correspond to the signal propagation times T1, T2, T3 depicted in FIGS. 2(a), 2(b) and 2(d). The above considerations serve to clearly illustrate the time sequences in FIG. 2(a)–2(e). They do not contradict a time reference provided by the fixed base station BTS, such as is usually the case in the GSM, for example.

According to FIG. 2(a), mobile station MS1 transmits to the time slot S1 for example in advance by a time interval T1, which compensates the signal propagation time for the distance d from MS1 to the fixed base station BTS. Mobile station MS2, which happens to be positioned at the edge of radio cell C, transmits to time slot S2 in advance by a time interval T2, which compensates for the maximum signal propagation time TD of the radius r of radio cell C. The method of calculating these time intervals to bring about a compensation for the signal propagation times, is known for example from the GSM under the concept of "Timing Advance Control". This method is described e.g. in the cited "GSM" book by Mouly and Pautet.

As illustrated in FIG. 2(c), the compensation of the signal propagation times causes the TDMA radio pulses transmitted by the mobile stations to integrate themselves without overlapping into the S0 to S7 time slot sequence when they are received by the TDMA radio receiver.

In addition, FIG. 2(d) depicts the time interval during which the mobile radio station MS3 transmits its TDMA radio pulses. Although this mobile station is positioned outside of radio cell C, as with the GSM, the fixed base station assigns it a time slot S3 within the sequence S0 to S7 and a time interval (Timing Advance) T3. This causes mobile station MS3 to transmit with a time interval that is in advance by a time interval T3, referred to the time reference t=0, which also characterizes the start of the reception of time slot sequence S0–S7 within radio receiver RX. Accordingly, a Timing Advance Control is also used for such mobile stations MS3 which are positioned outside of the (normal) radio station C, in the same manner as for the (normal) mobile stations positioned inside the radio cell.

To receive the transmitted TDMA radio pulses from these mobile stations, which are positioned outside of the normal radio cell C, the additional radio receiver RXe receives with a time displacement with respect to the (normal) radio receiver RX. As shown in FIG. 2(e), the additional radio receiver RXe scans while lagging one time interval TD behind the received radio signals. This time interval TD has for example a length of 233 µs and corresponds to the maximum signal propagation time inside of radio cell C. This causes the received sequence of time slots (S0', Si', . . ., S7') to be time displaced in the additional receiver RXe in such a way, that the TDMA radio pulses which are transmitted with a conventional Timing Advance by the mobile station positioned farther away (like MS3 in this case), are received and scanned at the correct time. Thus, the fixed base station supplies a radio cell Ce extended to the radius R=2r.

While maintaining the usual Timing Advance Control method, the fixed base station is thereby in a position to supply an extended radio cell Ce within which the mobile stations only need to compensate for signal propagation times that are smaller than the maximum signal propagation time TD. In general, the maximum signal propagation time TD is limited by system specifications, such as e.g. in this case a 6-bit coding of the timing advance to TD=233 µs.

To avoid overlapping of the TDMA radio pulses on the receiving side of the fixed base station, the time control TC assigns the time slots to the mobile stations as follows:

The mobile stations inside the radio cell C are assigned adjacent time slots within the sequence, such as in this case e.g. S1 and S2. In the same way, the mobile stations in the extended radio cell area are assigned adjacent time slots that do not overlap those in cell C. This prevents the TDMA radio pulses from near and far mobile stations to arrive in alternating form at the fixed base station, which would cause the TDMA radio pulses to overlap each other at the receiving end. Such overlapping would occur e.g. if the mobile stations inside the radio cell were assigned time slots with even order numbers S0, S2, S4 etc. and the mobile stations in the extended area were assigned time slots with odd numbers S1, S3, S5, etc. As shown in FIGS. 2(c) and 2(e), a radio pulse received in time slot S3' would overlap a radio pulse received in time slot S4.

However, in this example the fixed base station BTS always assigns adjacent radio time slots to the mobile stations inside and outside of radio cell C in a way so that the mobile stations inside radio cell C receive adjacent time slots with a lower magnitude number than the mobile stations outside of the radio cell. This way there are only two transitions in the sequence of time slots between the reception of the TDMA radio signals transmitted by the more or less remote mobile stations. In this way, the indicated time slot assignment achieves the most efficient time slot utilization.

In the configuration of the invention described here, all radio time slots are used for communication transmission i.e. they are so-called traffic channels. However, if the radio time slot is used for signalization, particularly to establish a connection as a so-called RACCH (Random Access Channel), the following radio time slot S1 must be kept open. This prevents a collision of signalization radio pulses (Random Access Burst) transmitted by farther removed mobile stations with traffic radio pulses (Traffic Burst) transmitted by other mobile stations.

The fixed base station BTS described here is in a position to correlate the TDMA radio signals received in the different receiving branches (RX and RXe) in accordance with the Diversity-Reception principle. For example, in this instance the TDMA radio pulse received by radio receiver RXe in time slot S3' as shown in FIG. 2(e), is also received by radio receiver RX in time interval DIV, as shown in FIG. 2(c). This time interval DIV covers partial areas of time slots S3 and S4 in reference to the receiving branch RX. Since each of the two receiving branches has a separate receiving antenna and the respective TDMA radio receiver, a Diversity-Reception signal is formed within the baseband processing by correlating the scanning values from both receiving branches. The assignment of scanning values SV, SV' scanned at the same time is important here. Thus, the fixed base station BTS is suitable to compensate for multipath reception.

The described fixed base station BTS with the described extended radio cell is a possible configuration form of the invention. But an extended radio cell made up of several annular extension zones can also be imagined, where each of them has a maximum radial expansion corresponding to the maximum allowable signal propagation time in the system. In this way conventional mobile stations can move within the extended radio cell and communicate with the fixed base station like in a conventional, spatially limited radio cell.

The invention has been described with the example of a mobile radio system. Configuration forms for cellular radio networks with stationary remote stations can also be envisioned, so-called fixed wireless radio networks. The invention permits large-size expansion of the radio cells, which leads to a reduction in the total number of fixed base stations in the system. This provides for a reduction in the infrastructure costs.

The invention can also be used for cellular radio networks in buildings, such as e.g. DECT (Digital European Cordless Telephone). The proposed fixed base station allows simple and rapid extension of existing radio cells. This makes it possible to plan for a very flexible radio network.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Fixed base station (BTS) for a cellular radio network comprising a TDMA radio receiver (RX) for a radio cell (C), which receives TDMA radio pulses on at least one carrier frequency within a sequence of time slots (S0, S1, . . . , S7), which are transmitted by at least one mobile station (MS1) with reference to a time that is advanced by one time interval (T1) with respect to one of the time slots (S1), which increases with the distance from the fixed base station (BTS)

to a maximum time interval (TD) corresponding the maximum signal propagation time (TD) within the radio cell (C), to compensate for the propagation time of the TDMA radio pulse, characterized in that the fixed base station (BTS) contains at least one additional TDMA radio receiver (RXe), which receives on the at least one carrier frequency, but within a sequence of time slots (S0', S1', ..., 7') that lags at least by the maximum time interval (TD), that the fixed base station (BTS), by means of a TDMA time control (TC) and by means of a radio transmitter (TX), assigns such time slots (S1, S2), which are adjacent to each other, to mobile stations inside (MS1, MS2) the radio cell (C) and assigns such other time slots which are adjacent to each other to the mobile stations outside of the radio cell (C) for transmitting the TDMA radio pulses, so that the fixed base station (BTS) receives the TDMA radio pulses from the most possible mobile stations within an extended radio cell (Ce).

2. Fixed base station (BTS) as claimed in claim 1, characterized by a digital circuit (BSB) connected to the TDMA radio receivers (RX, RXe), which scans and correlates (DIV) with each other the TDMA radio pulses received in the respective receiving paths, causing the fixed base station (BTS) to receive in accordance with a diversity principle.

3. Fixed base station (BTS) as in claim 1, characterized in that the fixed base station centrally serves the extended radio cell and contains n (n>1) of the additional radio receivers, of which the ith radio receiver, where i equals a consecutive index from 1 to n, receives with a lag that is i-times the maximum time interval, so that the extended radio cell is divided into i+1 concentric zones, which have radial extensions (r) of the same size corresponding to a maximum propagation time interval (TD), and so that each mobile station compensates only for the signal propagation time inside of its respective zone.

4. Time Division Multiple Access (TDMA) time control (TC) for controlling a fixed base station (BTS) for a cellular radio network, which contains a TDMA radio receiver (RX) for a radio cell (C), which receives TDMA radio pulses on at least one carrier frequency within a sequence of time slots (S0, S1, ..., S7) that are transmitted by at least one mobile station (MS1) with reference to a time that is advanced by one time interval (T1) with respect to one of the time slots (S1), which increases with the distance from the fixed base station (BTS) to a maximum time interval (TD) corresponding to the maximum signal propagation time within the radio cell (C), to compensate for the signal propagation time of the TDMA radio pulse, characterized in that the TDMA time control (TC) for controlling the fixed base station (BTS), which contains at least one additional TDMA radio receiver (RXe) receiving on the at least one carrier frequency, but within a sequence of time slots (S0', S1', S7') that lags at least by the maximum time interval (TD), by means of a radio transmitter (TX) assigns such time slots (S1, S2), which are adjacent to each other, to mobile stations inside (MS1, MS2) and assigns such other time slots (S3), which are also adjacent each other, to mobile stations (MS3) outside of the radio cell (C) for transmitting the TDMA radio pulses, so that the fixed base station (BTS) receives the TDMA radio pulses from the most possible mobile stations within an extended radio cell (Ce).

\* \* \* \* \*

UNITED STATES PATENT AND TRADEMARK OFFICE
CERTIFICATE OF CORRECTION

PATENT NO.  : 5,544,171
DATED       : August 6, 1996
INVENTOR(S) : R. Godecker

It is certified that error appears in the above-indentified patent and that said Letters Patent is hereby corrected as shown below:

At column 7, line 7 (claim 1, line 15), please change "(S0', S1', ..., 7')" to --(S0', S1', ..., S7')--.

At column 8, line 25 (claim 4, line 22), please delete the "." after "each".

Signed and Sealed this

Fifth Day of November, 1996

Attest:

BRUCE LEHMAN

Attesting Officer    Commissioner of Patents and Trademarks